United States Patent [19]
Steffen et al.

[11] Patent Number: 5,770,865
[45] Date of Patent: Jun. 23, 1998

[54] APPARATUS AND METHOD FOR SENSING A FULL LEVEL CONDITION FOR A LARGE BASKET RECEPTACLE OR THE LIKE

[75] Inventors: Ronald W. Steffen, Springfield; John S. Galman, Chatham, both of Ill.

[73] Assignee: Dickey-john Corporation, Auburn, Ill.

[21] Appl. No.: 822,230

[22] Filed: Mar. 21, 1997

[51] Int. Cl.$^6$ .................................................. G01N 15/06
[52] U.S. Cl. ................. 250/577; 250/223 B; 250/559.21
[58] Field of Search ............................... 250/577, 223 B, 250/559.21, 559.4, 222.1, 223 R, 576, 357.1; 356/240, 239; 73/290 R, 291, 293, 152.18, 152.21

[56] References Cited

U.S. PATENT DOCUMENTS 4,591,719  5/1986  Bonnemay ........................... 250/357.1

*Primary Examiner*—Que Le
*Attorney, Agent, or Firm*—Leydig, Voit & Mayer, Ltd.

[57] ABSTRACT

An apparatus and method is disclosed for sensing a full level condition for a large basket. A signal generator produces an oscillating signal which is applied to energy emitters that are capable of transmitting electrical energy along defined paths and across the width of the large basket. The transmitted electrical energy is received by a plurality of receivers which output an electrical signal which is representative of the signal applied to the energy emitters when material which is being loaded into said basket does not interfere with the energy being transmitted along the defined paths. A logic circuit analyzes the signals output from the receivers and produces a status signal indicating whether material which is being loaded into the large basket has interfered with the energy being transmitted along the defined paths.

12 Claims, 3 Drawing Sheets

APPARATUS AND METHOD FOR SENSING A FULL LEVEL CONDITION FOR A LARGE BASKET RECEPTACLE OR THE LIKE

FIELD OF THE INVENTION

The present invention relates generally to a system and method for determining when material being loaded into a basket has reached a predetermined level. Although the descriptions given throughout this specification represent a preferred embodiment which utilizes a cotton basket, it is understood that the present invention is applicable to detecting a full basket in any type of equipment which employs a basket or bin.

BACKGROUND OF THE INVENTION

Mechanized cotton pickers are generally operable to remove cotton from cotton plants and to deposit the removed cotton into a basket or receptacle. The cotton is physically separated from the cotton plants by spindles and doffers which are generally located within a self propelled picking unit. The separated cotton is then fed into a chute via an air stream and are ultimately deposited in a collection basket mounted to the top or rear of the machine.

Due to the mounting location of the cotton basket, the machine operator, while operating the machine, cannot easily view the amount of cotton which has been deposited in the basket. This creates a problem for the operator because the operator cannot determine when the basket is filled to a desired capacity. If the operator continues to operate the machine after the basket has exceeded its capacity, any further picked cotton will jam and/or damage the air chute and associated mechanisms. Thus, further operation of a cotton picking machine after the basket has exceeded a desired capacity may result in undesired down time to clean the machine of plugged cotton.

In order to avoid filling a basket beyond its capacity, operators will frequently dump the cotton out of the basket long before the basket has been filled to its optimum capacity. This early emptying of the basket wastes valuable picking time because the machine is idled while an underfilled cotton basket is emptied.

Therefore, it is advantageous for the operator to know exactly when the basket has been filled to its optimum capacity in order to maximize picking efficiency while minimizing the problems associated with an over-filled basket.

Various mechanical sensors have been utilized in an attempt to detect the "full" condition of the basket. Such mechanical sensors have been ineffective for extended use in cotton pickers because of the particularly inhospitable environment of the basket. That is, the mechanical sensors must contact the cotton and, as a result, they tend to break-down and/or fall out of adjustment. Additionally, some mechanical sensors cannot differentiate between a full condition in the basket and "stringers" which are pieces of cotton that become attached to objects, such as mechanical sensors and any other jutting surface in the path of the cotton.

To attempt to overcome the problems associated with the mechanical sensors, various non-mechanical sensors have been utilized. Such non-mechanical sensors generally utilize a light emitting diode ("LED") and phototransistor which serve to define an optical light path. When the light path between the LED and phototransistor becomes blocked, the sensor indicates a full basket condition. This sensor arrangement had advantages over the mechanical sensors because it did not have to physically contact the cotton being deposited in the basket in order to determine whether the basket was full. Additionally, the LED could be pulsed at a given frequency so that the phototransistor detector circuit could be operable to filter out all other DC components, such as ambient sunlight. A sensor operated in this manner would, therefore, only respond to the pulsating light source at one end of the "light path."

These non-mechanical sensors, however, are limited because they have only a single light path which can become obscured by the cotton "stringers" noted above. If such a stringer interrupted the light path between an emitter and a detector, the system would indicate a false condition to the operator. Moreover, such sensors are incapable of discriminating between certain transient conditions which would indicate a false "full" condition instead of a truly "full" condition.

OBJECTS AND SUMMARY OF THE INVENTION

It is therefore the general object of the present invention to provide an apparatus which accurately detects when material being deposited in a basket or receptacle has reached a preselected level.

It is a further object of the invention to provide a detector capable of determining and indicating when material being deposited into a basket has reached a preselected level by utilizing a plurality of light paths for visible or invisible light, each of which must be interrupted by material being deposited into the basket before an output circuit will indicate that a receptacle has been filled to the desired level.

Yet another object of the invention is to reduce false indications that the basket has been filled to desired capacity by providing a delay circuit which operates to delay a preliminary indication for a preset period of time during which time the detector must show continuous blockage to provide a final indication of a full basket condition.

It is another object of the invention to detect a desired full level condition in a basket by providing a novel circuit and logic arrangement which uses a plurality of light emitting diodes, a plurality of phototransistors capable of producing output signals in response to the light emitting diodes, a device suitable for generating a delay signal, a logic circuit for combining the delay signal with the output of the phototransistors, and an output device.

The foregoing and other objects and advantages are accomplished by the present invention which, among other things, uses a plurality of energy emitting devices ("emitters") which are directed to a plurality of energy receiving devices ("receivers"). The combination of emitters and receivers creates a number of energy paths, the exact number of which depends on the number of emitters and receivers. In a preferred embodiment, the energy generated by the emitters and detected by the receivers is infrared ("IR") radiation.

The energy or radiation paths cross the basket or receptacle at a preselected level. The preselected level corresponds to a "basket-full" condition. Thus, although the term "basket-full" is used, it should be construed only to mean that the material has reached the preselected level and not necessarily that the basket is physically full.

The receivers output a signal to a logic circuit, the nature of which depends on the energy received through a particular radiation path or combination of paths. The logic circuit performs a logical "OR" function for the signals received from each receiver. If the light path or paths for any particular receiver are sufficiently obscured by material, the output signal from that receiver will not contribute to the "ORed" signal. The "ORed" signal is then phase compared with the transmitted LED Signal. In one embodiment of the invention, the logic circuit will output a signal that the preselected basket-full condition has been reached when the phase difference exceeds a predetermined threshold as a result of all of the receivers being obscured by material being loaded into the basket. In other embodiments, it is contemplated that the logic circuit will output a bin-full signal when fewer than all of the receivers have been obscured.

In one embodiment of the invention, a delay circuit is used to delay the indication that the basket is full. In this embodiment, the output of the logic circuit is provided as a reset input to a counter circuit. If the output of the logic circuit indicates a basket-full condition, the counter circuit is activated and it counts for a preset period of time, i.e. generates a delay. After the delay, the counter circuit will generate a final basket-full signal if the output of the logic circuit has not, in the interim, changed states from a basket-full condition to a non-basket-full condition. That is, if the logic circuit ever outputs a signal which is not a basket-full signal, the counter circuit will reset and will not output a final basket-full condition.

By providing a plurality of radiation paths, the present invention will be substantially unaffected by the stringer condition noted above. That is, if one stringer obscures a single radiation path, other radiation paths will not be affected. Moreover, by providing a delay, the present invention will reduce the possibility that a transient blocking condition will cause a false indication of a basket-full condition.

DETAILED DESCRIPTION OF THE PREFERRED EMBODIMENT

Figure 1:
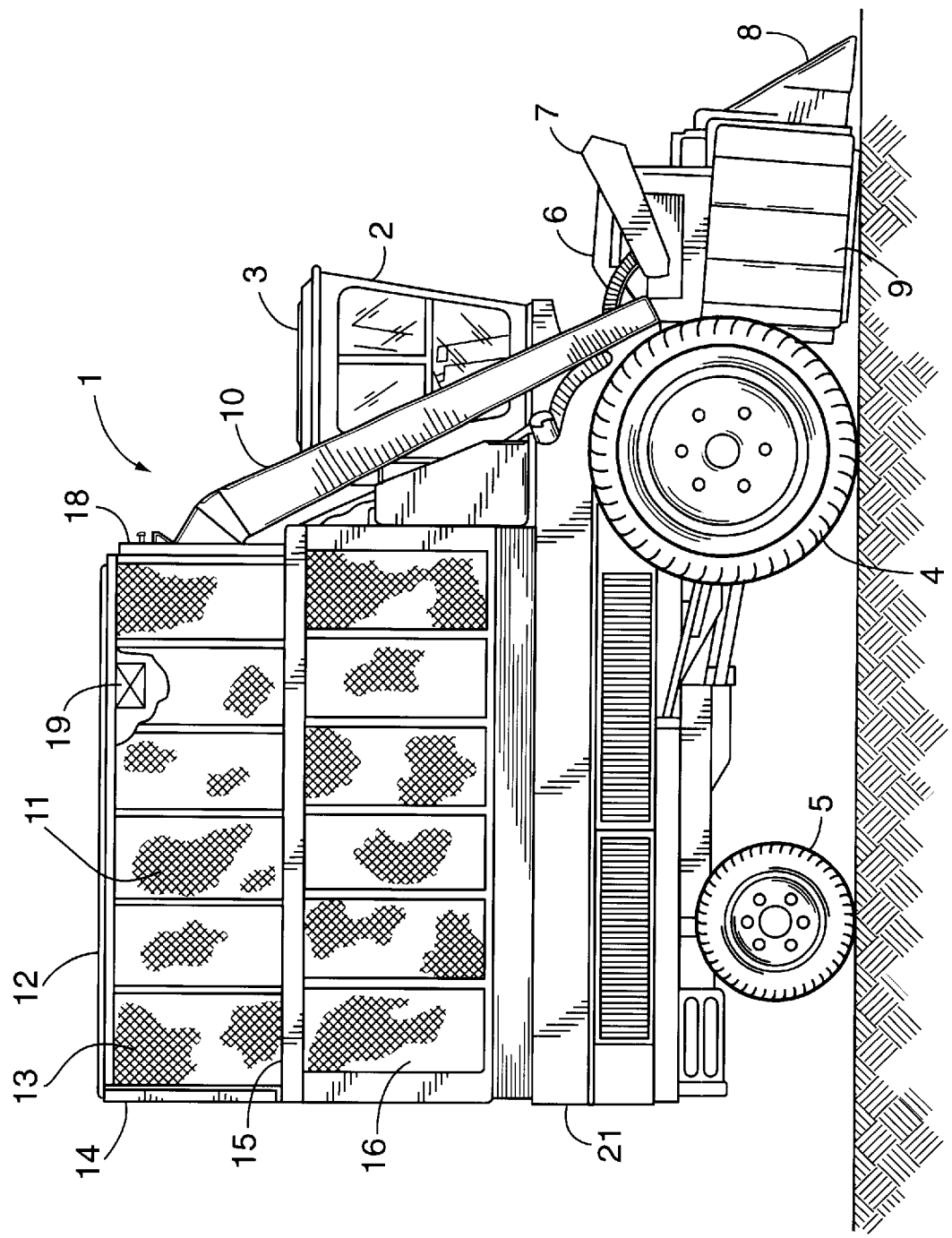
FIG. 1 is a side view of a cotton picker with a large cotton basket mounted thereto.

FIG. 1 is a side view of a mechanized cotton picker 1. The picker includes an operator station 2 from which an operator can control the operation of the picker 1. The picker 1 includes necessary powertrain components such as an engine and transmission (not shown) in appropriate compartments illustrated generally by reference numeral 3. Picker 1 also includes a pair of driven wheels, indicated in FIG. 1 by reference numeral 4, and a pair of steering wheels, indicated in FIG. 1 as reference numeral 5.

The cotton picker 1 is equipped with a picking unit 6. As the picker 1 moves through a field of cotton plants, the cotton plants are directed by stalk lifters 8 into picking unit 6. Picking unit 6 is equipped with conventional doffer columns, picker bars, and spindles (not shown) in compartment 9 which are operable to separate the cotton from the cotton plant stalks. Picking unit 6 includes all necessary drives, e.g. drive 7, to operate the spindles and doffer columns. After the cotton is separated from the stalks of the cotton plant, an air stream blows the cotton through chute 10 for ultimate depositing in a cotton collection basket 11.

Collection basket 11 may be of unitary construction or may be separated into sections. In the illustrated embodiment of FIG. 1, the collection basket 11 is formed by an upper basket section 13 and a lower basket section 16. The upper and lower basket sections are framed by appropriate members such as 12, 14–15 and 18. Frame members 14 and 18 are designed such that the upper section 13 may be recessed into the lower section 16 when the picker 1 is not in use. Both the upper and lower basket sections are surrounded by a wire mesh or other suitable means to ensure that the cotton being deposited in the basket remains in the basket. FIG. 1 also illustrates a mounting 19 for one component of the sensing apparatus described below. An additional mounting location is illustrated by reference numeral 20 in FIG. 2.

Figure 2:
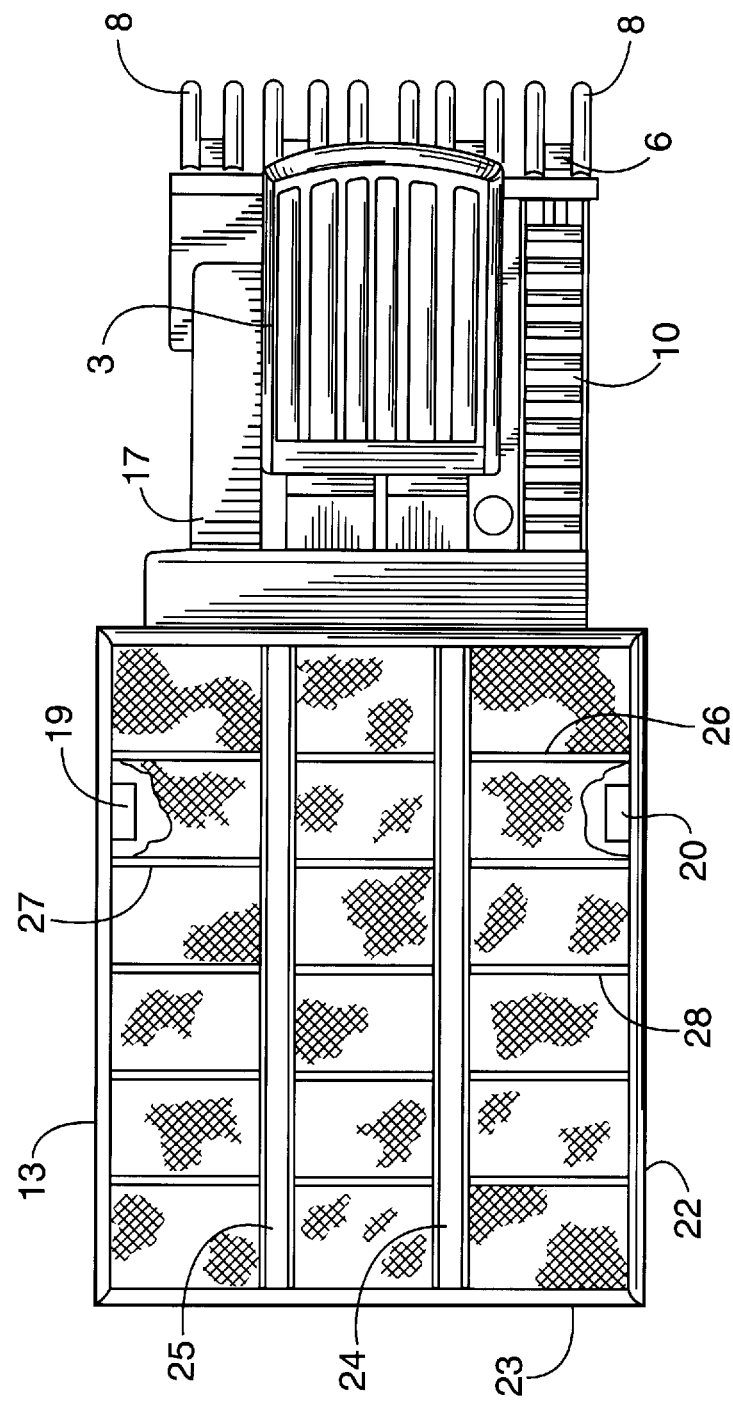
FIG. 2 is a top view of a cotton picker with a large cotton basket mounted thereto.

FIG. 2 is a top view of picker 1. The top 3 of the operator's station 2 is illustrated along with picking unit 6, stalk lifters 8 and chutes 10 and 17. The top section 13 of collection basket 11 is reinforced by cross-members 26–28 and longitudinal members 24–25. The mounting for two components of the sensing apparatus is illustrated at 19 and 20. Although illustrated as open, the top of the collection basket 11 is generally topped with wire mesh or other suitable means to ensure that the deposited cotton remains in the basket.

Although the mountings 19 and 20 for the sensing apparatus are generally indicated as horizontally opposed, it is recognized that the mounting for the sensing apparatus may be in any direct line. Indeed, if appropriate, the mountings 19 and 20 need not even be in a direct line if mirrors or the like are used to provide a substantially clear path between mountings 19 and 20 when the basket is not suitably full. Additional mounting locations may be needed, as described below, if the components of the sensing apparatus are not located in a unitary housing.

Figure 3:
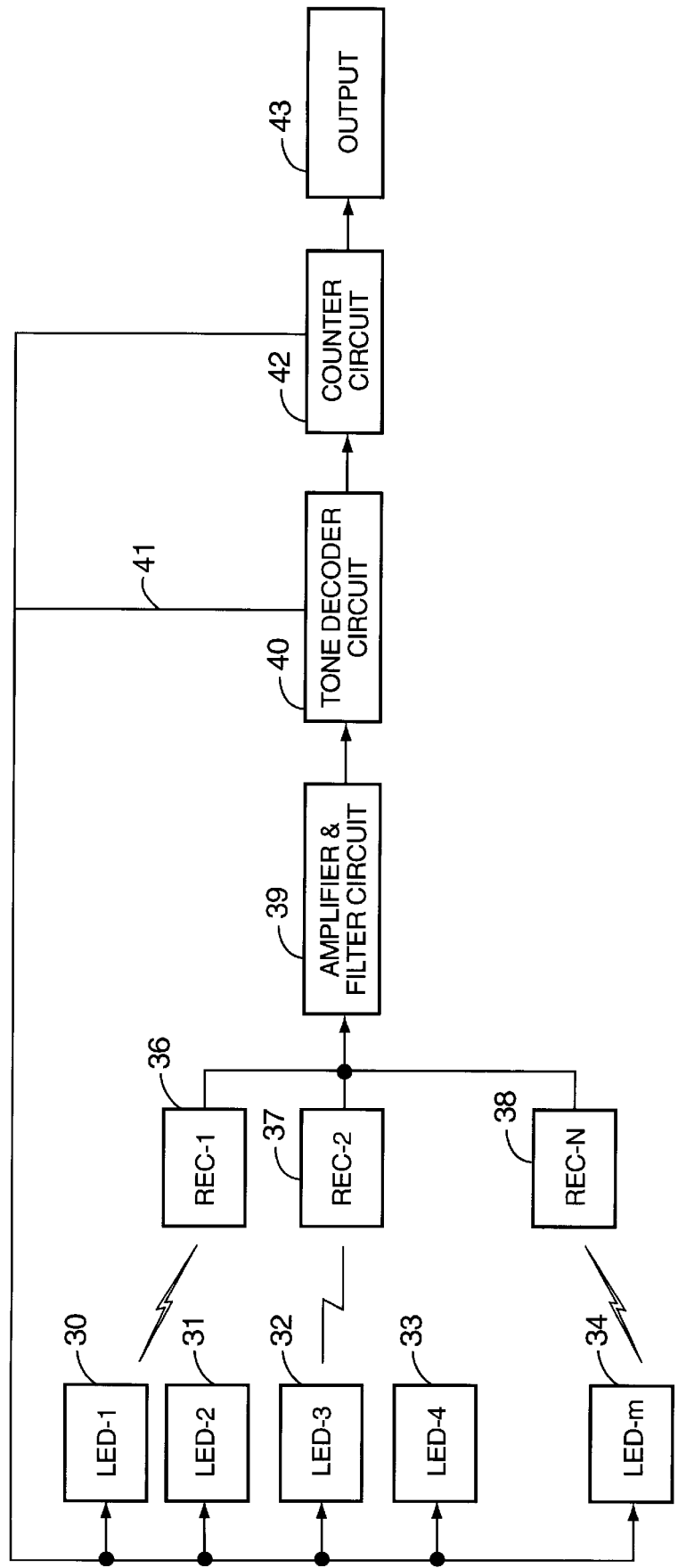
FIG. 3 is a block diagram of a preferred embodiment of the described system.

FIG. 3 illustrates a block diagram of a sensing apparatus in accordance with the invention. A generalized description of the components in the block diagram is first presented followed by an overall system description. In general, a plurality of energy emitting devices 30–34 are utilized to radiate energy. In a preferred embodiment of the invention, the emitters are light emitting diodes ("LEDs") which generate electromagnetic infrared radiation. Although LEDs are used in a preferred embodiment, it is understood that other energy emitting devices, such as those capable of outputting sound pressure waves or coherent electromagnetic energy, e.g. laser sources, may be employed. In addition to the emitting devices, there are a plurality of energy receiving devices 36–38, which may be electro-magnetic energy receiving devices such as phototransistors. The number of emitters need not correspond to the number of receivers. Thus, in FIG. 3, the highest numbered LED is represented by "LED-m" whereas the highest numbered receiver is represented by "REC-n."

The radiation generated by LED-1 (30) through LED-m (34) is received by receivers REC-1 (36) through REC-n (38). Thus, a plurality of radiation paths are defined by the number of energy emitters. That is, the maximum number of separate radiation paths is equal to the number of emitters multiplied by the number of receivers. In a preferred embodiment, there are a total of five (5) LED-type emitters and a total of three (3) receivers which define a maximum of fifteen (15) separate emitter-receiver radiation paths. Depending on the number of emitters, the number of receivers, the physical separation between the individual emitters, the physical separation between the individual receivers, and the physical separation between the respective emitters and receivers, it is possible for individual receivers to receive energy from more than one emitter. In the preferred embodiment, the inter-emitter spacing is approximately 1.25 inches and the inter-receiver spacing is approximately 2.00 inches. It is contemplated that the emitters and receivers will be separated by approximately ten (10) feet.

The receivers may be any device capable of receiving the energy supplied by the emitters. In a preferred embodiment, the receivers are conventional phototransistors. The outputs of the phototransistors are electrically connected to each other such that all of the phototransistors are logically ORed to each other. The ORed signal is then coupled to an amplifier and filter circuit 39.

The amplifying and filtering circuit 39 conditions the logically ORed output received from the phototransistors for ultimate input into the tone decoder circuit 40. Circuit 39 serves to filter undesired frequency components from the ORed signal as well as to boost the signal to an appropriate level for input to the tone decoder circuit 40. The amplifier circuit 39 may include operational amplifiers connected in a conventional and well-known manner.

Tone decoder circuit 40 may be an integrated circuit. In a preferred embodiment, tone decoder 40 is an NE567D integrated circuit manufactured by Philips Corporation. This tone decoder produces an oscillating signal which oscillates at a selected predetermined frequency. This signal is used to pulse the LEDs at the predetermined frequency. The output of the tone decoder 40 is a digital "high" or "low" depending upon the phase relationship between its internal oscillator and the signal received from amplifier 39. When the radiation paths are not blocked, the digital output of tone decoder 40 continually resets a counter circuit 42 which is clocked by the tone-decoder's oscillator. When all radition paths are blocked, however, the output of tone decoder 40 permits counter circuit 42 to begin counting to a preset value. The output of the counter circuit 42 is then fed to an output device 43 which serves to warn the operator of the basket-full condition. Such output device 43 may be an audible device such as a siren or buzzer or may be a visible device such as a flashing light or it may have both audible and visible components. Additionally, output device 43 may be a signal processing circuit which modifies the counter output to a signal suitable as an input to another device such as the system console used by the operator to operate the cotton picker 1.

The system of FIG. 3 operates in the following manner. Tone decoder circuit 40 produces an oscillating signal which is output over line 41. The signal from line 41 acts as an input to each of the energy emitters 30–34 which, in turn, emit energy having a frequency corresponding to the oscillating signal. Thus, the LEDs of the preferred embodiment will emit pulses of infrared radiation corresponding to the frequency of the oscillating signal received through line 41. The pulses of infrared radiation travel across the cotton basket and are received by the energy receivers 36–38.

As noted above, in a preferred embodiment, there are five emitters and three receivers which are spaced across the approximately 10 feet width of the cotton basket. Due to the close inter-emitter and inter-receiver spacing of the preferred embodiment, each receiver will receive pulsed radiation from each of the five LEDs. Thus, the radiation paths overlap.

The outputs of receivers 36–38 are logically ORed together and amplified in the amplifier and filter circuit 39. The amplification is generally necessary due to signal degradation and loss as the pulsed radiation travels across the basket. The phototransistor output of the preferred embodiment is also filtered to remove DC components, such as any component which may exist as a result of sunlight, and other frequency components which are outside the desired bandwidth of the system. In the preferred embodiment, the signal produced at the output of circuit 39 will be representative of the oscillating signal output by the tone decoder at line 41 if the radiation paths are not blocked by the cotton being deposited in the basket. On the other hand, if all of the radiation paths are blocked, the signal output by circuit 39 will not be representative of the signal output on line 41 of the tone decoder. The signal output from circuit 39 is then fed into the tone decoder circuit.

Tone decoder circuit 40 receives the output of the circuit 39 as a conditioned input and compares it with the reference signal which is output over line 41. If the frequency and/or phase of the output of circuit 39 approximates the frequency and/or phase of the reference oscillating signal, the decoder 40 will output a constant level signal which indicates that the material has not surpassed the predetermined fill level. In a preferred embodiment, the decoder 40 will output a signal indicating that the two compared signals match within an acceptable margin, i.e. that the basket is not full. This constant level signal will hold the counter 42 in reset. On the other hand, if the frequency and/or phase of the signal at the output of circuit 39 do not match the frequency and/or phase of the reference oscillating signal, the tone decoder 40 will output a signal level indicating that the basket is full. This output signal will permit the counter 42 to begin counting to a predetermined number.

Once it is determined that the two compared signals do not match within the acceptable margin, a basket-full condition may be appropriate. In some instances, however, the compared signals may not match but a basket-full condition is, nevertheless, inappropriate. Such an instance may occur where the material being deposited in the basket temporarily blocks all radiation paths. In this instance, the output of circuit 39 will not match the reference signal but the material being deposited in the basket has not yet surpassed the predetermined threshold. This condition is known as a false basket-full condition. Once the material which temporarily blocked all of the light paths is no longer blocking all of the paths, the output of circuit 39 will again match the reference signal within the acceptable margin and it will be clear that a basket-full condition is inappropriate. To reduce the possibility of indicating a false basket-full condition, the present invention utilizes a delay circuit which, in the preferred embodiment, corresponds to counter circuit 42 of FIG. 3.

The counter circuit 42 receives the output of the decoder circuit 40. The counter circuit 42 will be activated in the preferred embodiment when the decoder 40 outputs a signal indicating all light paths are blocked. Once activated, the counter circuit 42 will count to a predetermined count and, thereby, produce a predetermined time delay. At the end of the delay, the counter circuit will output a logical high signal to the above-described system output which, in turn, will indicate a basket full condition. The counter circuit 42, however, will be reset at any time that the output of the decoder circuit 40 and associated circuitry detect any unblocked optical paths. Thus, a temporary blockage of all energy receivers will not result in a false basket-full condition.

Other objects, features, and advantages of the present invention will be more readily apparent upon reading the above description. For example, the use of frequency discrimination techniques may be employed in lieu of or in combination with the phase discrimination techniques described above. It should be understood that the detailed description and specific embodiment are given by way of illustration only, since various changes and modifications within the spirit and scope of the invention will become apparent to those skilled in the art from this detailed description.

What is claimed is:

1. A sensing apparatus for sensing when a basket for receiving material has been filled to a predetermined level comprising:
   a signal generator capable of generating a reference signal which oscillates at a preselected frequency;
   a plurality of energy emitters mounted to the basket, said emitters receiving said reference signal and emitting energy at said preselected frequency, said energy directed along a plurality of paths;
   a plurality of energy receivers spaced apart from the emitters along said paths and mounted to the basket such that the receivers receive a portion of said emitted energy if the basket has not been filled with material beyond the predetermined level, said receivers producing a receiver output signal representative of the energy received; and
   a first circuit which compares the receiver output signal with the reference signal and produces a status signal indicating whether the receiver output signal does not correspond to the reference signal.

2. The sensing apparatus of claim 1 wherein the number of emitters is m and the number of receivers is n and the number of paths is less than the product of m and n.

3. The sensing apparatus of claim 1 wherein the number of emitters is m and the number of receivers is n and the number of paths is equal to the product of m and n.

4. The sensing apparatus of claim 1 wherein each of said receivers generates a separate signal which are logically combined to generate said receiver output signal.

5. The sensing apparatus of claim 1 wherein some of said paths overlap.

6. The sensing apparatus of claim 1 wherein said first circuit comprises means for comparing the phase of said receiver output signal to the phase of said reference signal.

7. The sensing apparatus of claim 1 wherein said signal generator and said first circuit are implemented in a single tone decoder integrated circuit.

8. The sensing apparatus of claim 1 further comprising a second circuit receiving said status signal and generating an alert signal if said status signal indicates that said receiver output signal does not correspond to said reference signal for a predetermined time.

9. The sensing apparatus of claim 8 wherein said second circuit is a counter which increments at said preselected frequency during the time that said status signal indicates that said receiver output signal does not correspond to said reference signal and generates said alert signal upon said count reaching a predetermined value.

10. The sensing apparatus of claim 1 wherein said emitters are infrared light emitting diodes and said receivers are infrared-sensitive phototransistors or photodiodes.

11. The sensing apparatus of claim 1 wherein all of said emitters are mounted within one housing.

12. The sensing apparatus of claim 1 wherein all of said receivers are mounted within one housing.

* * * * *

UNITED STATES PATENT AND TRADEMARK OFFICE
CERTIFICATE OF CORRECTION

PATENT NO.  : 5,770,865
DATED       : June 23, 1998
INVENTOR(S) : Steffen et al.

It is certified that error appears in the above-identified patent and that said Letters Patent is hereby corrected as shown below:

In the title [54], line 3, "BASKET RECEPTACLE" should be --BASKET, RECEPTACLE--

In the specification, Column 1, line 3, "BASKET RECEPTACLE" should be --BASKET, RECEPTACLE--

In Column 4, line 43, "electromagnetic" should be --electro-magnetic--

Signed and Sealed this

Tenth Day of November 1998

*Attest:*

BRUCE LEHMAN

*Attesting Officer*      *Commissioner of Patents and Trademarks*